Jan. 8, 1952        H. F. JACKSON        2,581,535
HOLE DIGGING ATTACHMENT FOR TRACTORS
Filed Sept. 28, 1948        3 Sheets-Sheet 1

Inventor

Henry F. Jackson

By *Clarence A. O'Brien and Harvey B. Jacobson*
Attorneys

Jan. 8, 1952  H. F. JACKSON  2,581,535
HOLE DIGGING ATTACHMENT FOR TRACTORS
Filed Sept. 28, 1948  3 Sheets-Sheet 2

Inventor
Henry F. Jackson
By Clarence A. O'Brien
and Harvey B. Jackson
Attorneys Jan. 8, 1952 H. F. JACKSON 2,581,535
HOLE DIGGING ATTACHMENT FOR TRACTORS
Filed Sept. 28, 1948 3 Sheets-Sheet 3

Inventor
Henry F. Jackson

By Clarence A. O'Brien
and Harvey B. Jackson
Attorneys

Patented Jan. 8, 1952

2,581,535

UNITED STATES PATENT OFFICE 2,581,535

HOLE DIGGING ATTACHMENT FOR TRACTORS

Henry F. Jackson, Headland, Ala.

Application September 28, 1948, Serial No. 51,516

2 Claims. (Cl. 255—19)

This invention relates to new and useful improvements and structural refinements in devices for digging holes for posts, or the like, and the principal object of the invention is to provide a hole digging device of this character, such as may be conveniently and expeditiously employed in association with a conventional tractor equipped with a power take-off shaft and with a liftable and lowerable implement carrier. In particular, the invention contemplates the provision of a hole digging attachment for the hydraulically operated implement carriers of the so-called "Ford-Ferguson" type.

An important feature of the invention resides in the provision of a hole digging attachment which is carried by the tractor and in which the hole digging auger is actuated by the tractor power take-off shaft.

Another feature of the invention resides in the provision of means for automatically swinging the hole digging auger to an inclined, non-operative position as soon as the auger is withdrawn from the ground, whereby the entire attachment may be conveniently transported from one site of operation to another.

Important advantages of the invention lie in its simplicity of construction, convenience of manipulation, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
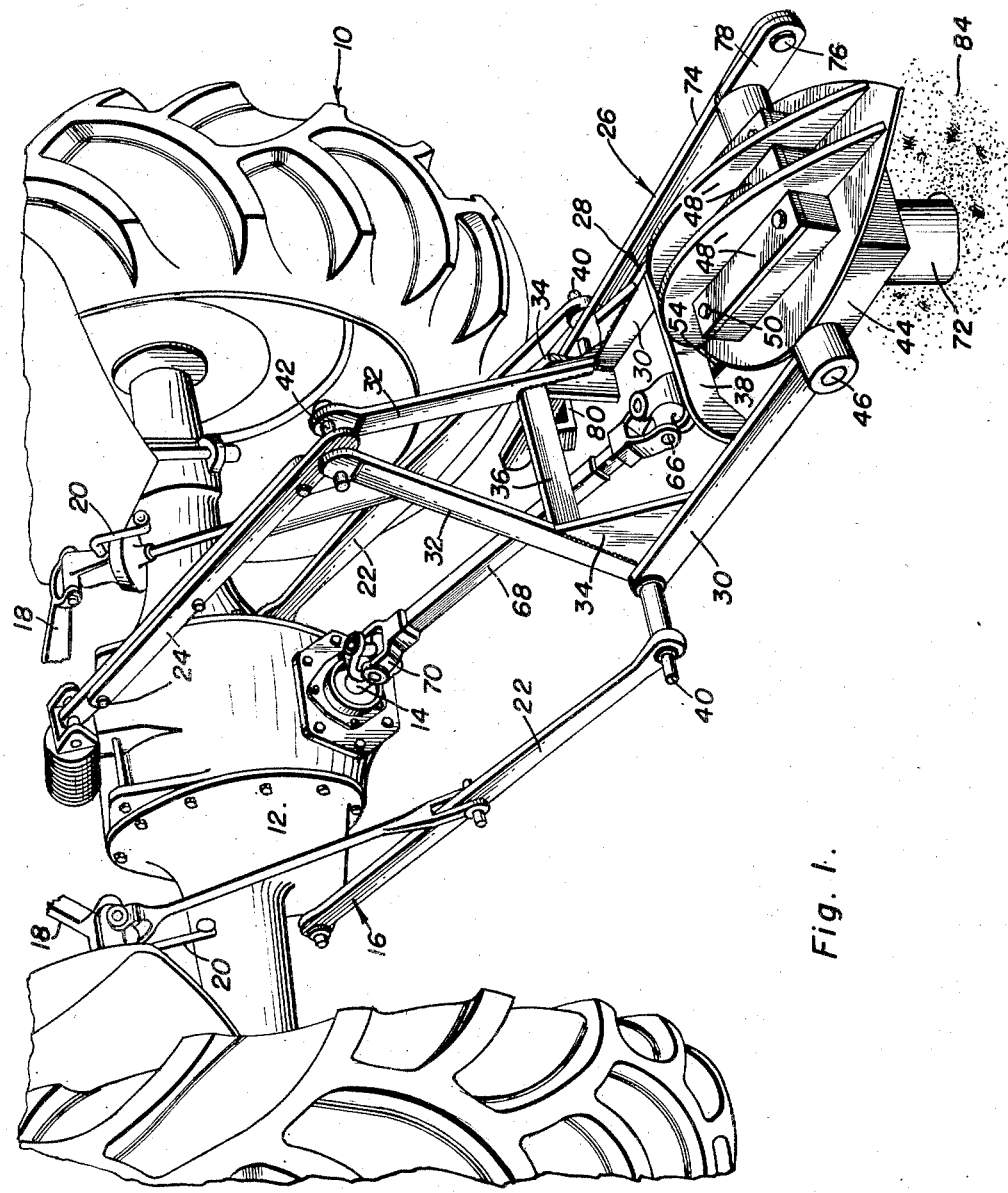
Figure 1 is a fragmentary perspective view of a tractor equipped with a conventional implement carrier, showing the invention in association therewith.

Referring now to the accompanying drawings in detail, the reference character 10 designates generally a tractor of the "Ford-Ferguson" type, the same including a rear axle housing 12 provided with a rearwardly projecting power take-off shaft 14 and also equipped with what may be called a liftable and lowerable implement carrier 16 of conventional design. This implement carrier is usually actuated by hydraulic means (not shown) through the medium of suitable cranks 18, and may also be "preset" by means of suitable hand cranks 20, as will be clearly apparent.

However, it may be stated that the carrier 16 includes a pair of upwardly and downwardly swingable arms 22 and an adjustable link 24, these arms and link being liftable and lowerable in the fashion of a substantial parallelogram upon actuation of the hydraulic means already referred to.

The invention resides in the provision of what may be called the hole digging attachment designated generally by the reference character 26, the same embodying in its construction a bracket assembly 28 fabricated from a pair of spaced and substantially horizontal side members 30 which are rigidly secured by welding, or the like, to upwardly convergent pieces 32, suitable gussets 34 being provided between the side members 30 and pieces 32 for purposes of reinforcement, as is best shown in Figure 1. Moreover, a cross member 36 is secured to intermediate portions of the pieces 32 and a cross bar 38 is similarly secured to intermediate portions of the side members 30, the purpose of the cross bar 38 being hereinafter more fully described The bracket assembly 28 is provided at the confluence of the side members 30 with the pieces 32 with laterally projecting trunnions 40 which pivotally engage rear end portions of the arms 22 of the aforementioned implement carrier 16, while a pin 42 pivotally attaches upper end portions of the pieces 32 to the arm 24 of the implement carrier, as will be clearly apparent. It may be explained at this point that the arrangement of the implement carrier arms 22, 24 and of the pieces 32 of the bracket assembly 28 is substantially in the nature of the three sides of a substantial parallelogram, whereby the pieces 32 of the bracket assembly 28 remain substantially vertical while the implement carrier 16 is being lowered or raised.

Figure 4:
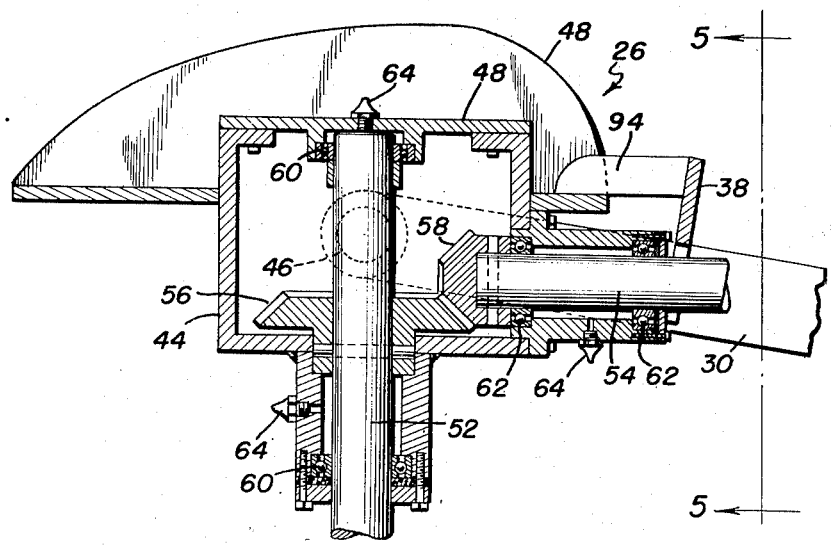
Figure 4 is a fragmentary cross sectional view of the invention, the same being taken substantially in the plane of the line 4—4 in Figure 5.
Figure 5:
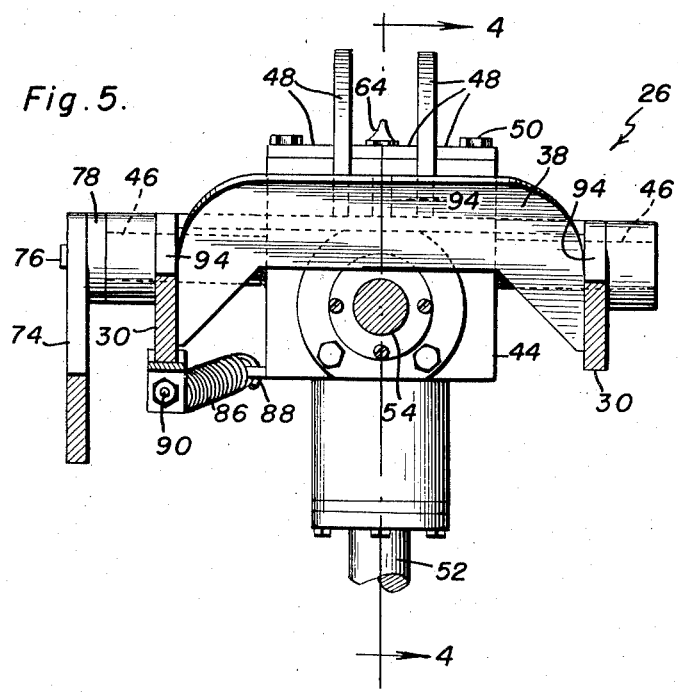
Figure 5 is a fragmentary cross sectional view, taken substantially in the plane of the line 5—5 in Figure 4.

What may be referred to as a gear head 44 assumes the form of a housing equipped with laterally projecting trunnions 46, these trunnions being pivotally mounted on or in the side members 30 of the bracket assembly 28 in such manner that the gear head 44 is swingable on a horizontal axis. The gear head 44 is equipped with what may be called a streamlined cover 48, this being removable as a unit from the gear head housing to which it is secured by suitable bolts or screws 50. The gear head 44 provides bearings for an auger shaft 52 and a countershaft 54, these two shafts being operatively connected together by suitable bevel gears 56, 58 respectively, disposed in the gear head, as is illustrated in Figure 4. The bearings for the shafts 52, 54 are indicated at 60, 62, respectively, these bearings preferably being of the anti-friction type, and the gear head as well as the cover thereof are provided with a plurality of fittings 64 whereby lubricants may be injected into the gear head, as will be clearly apparent.

Figure 2:
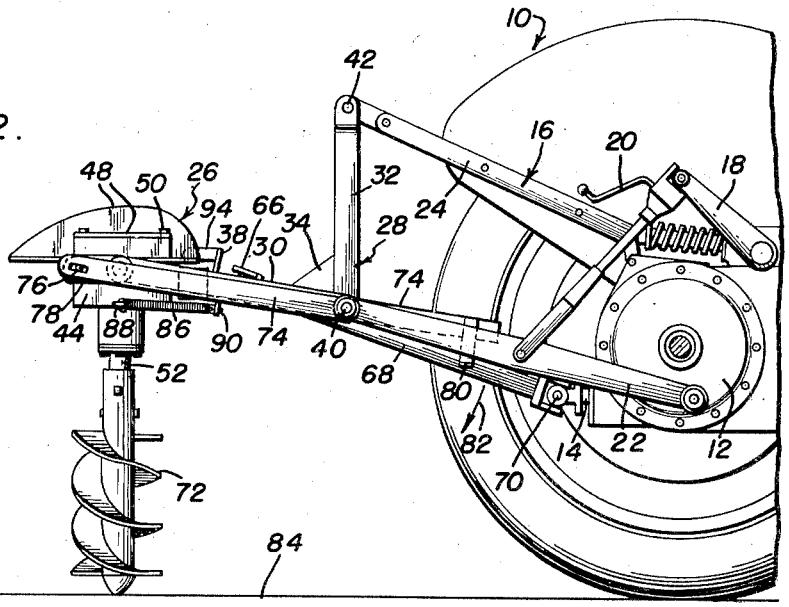
Figure 2 is a fragmentary side elevational view of the subject shown in Figure 1, the near wheel of the tractor being removed in order to clearly disclose the invention and the latter being shown in readiness for operation.
Figure 3:
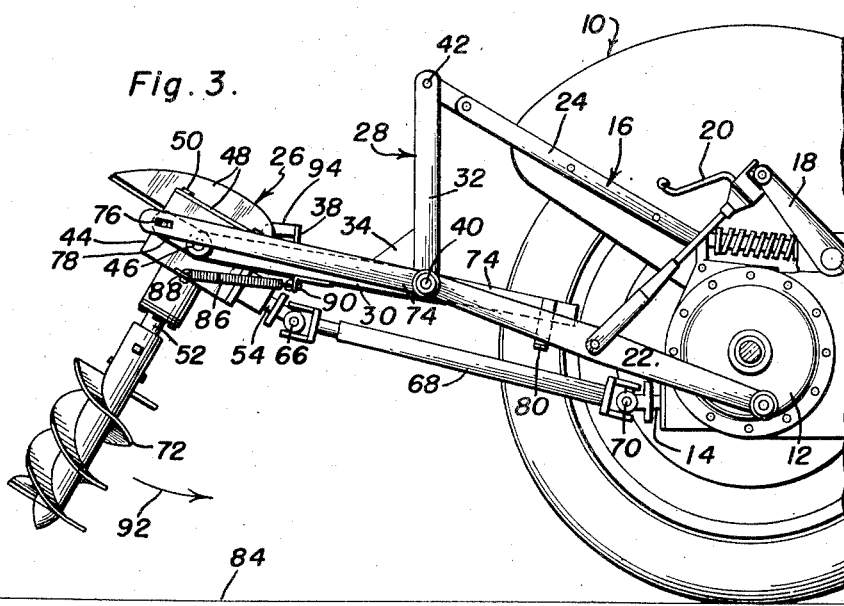
Figure 3 is a fragmentary side elevational view, similar to that shown in Figure 2, but illustrating the invention in its "portable" position after the auger has been withdrawn from the ground.

The countershaft 54 is operatively connected by means of a universal joint 66 to a telescoped drive shaft 68 which, in turn, is connected by a further universal joint 70 to the power take-off shaft 14 of the tractor, as is best shown in Figures 1 and 3. A suitable auger 72 is secured to the aforementioned shaft 52, the arrangement being such that this auger is disposed vertically when it is in its operative position as shown in Figure 2.

In this position, the implement carrier 16 is raised but not to the full extent, so that by rotating the auger 72 through the medium of the shaft 68 from the power take-off shaft 14, and simultaneously causing the carrier 16 to travel downwardly by virtue of the associated hydraulic means (not shown) the auger 72 will be urged into the ground so as to form a substantially vertical bore. Similarly, by simply raising the carrier 16, the auger 72 may be withdrawn from the ground to its initial position shown in Figure 2.

However, means are provided for automatically tilting the auger 72 after it is withdrawn completely from the ground, whereby the attachment may be transported on the tractor from one site of operation to another without the auger scraping along the ground or becoming entangled with various obstructions.

These means include a tilting lever 74 which is fulcrumed intermediately of its length on one of the aforementioned journals 40 and is pivotally connected at one end thereof as at 76 to a crank 78 which, in turn, is rigidly secured by welding, or the like, to one of the journals or trunnions 46 and hence to the gear head 44.

The remaining end portion of the tilting lever 74 is equipped with a laterally projecting bracket 80 which, when the device is in the position shown in Figure 2, is engageable with the lower edge of one of the aforementioned arms 22, as shown.

A tension spring 86 is anchored at one end thereof to the gear head 44 as indicated at 88, while the remaining end of the spring is anchored as at 90 to one of the side members 30. This spring urges the head 44 to pivot about the trunnions 46 in the direction of the arrow 92, which movement is transmitted through the crank 78 and lever 74 so as to urge the bracket 80 in engagement with the under side of the adjacent arm 22. However, the gear head cannot be swung forwardly as at 92 beyond a position where the auger 72 is substantially vertical, since in that position the cover 48 of the gear head comes in contact with a stop bracket 94 secured to the bar 38.

When the invention is placed in use, assuming the same to be in its "travelling" position as shown in Figure 3, the spring 86 sustains the bracket 80 in engagement with the adjacent arm 22, and thus this engagement does not permit the spring to swing the gear head to a position wherein the auger 72 is substantially vertical. However, when the arms 22 are lowered as shown at 82, the gear head and the auger are lowered bodily therewith, but since the trunnions 40 are more remote from the fulcrum of the arms 22 on the tractor than is the point of contact of the bracket 80 with the adjacent arm 22, the stated point of contact will descend at a slower rate than the trunnions 40 and, as a result, the spring 86, still urging the bracket 80 against the adjacent arm 22, will cause the lever 74 and the crank 78 to swing the gear head 44 about the pivots 46 until a position is reached when the auger 72 is vertical, the stop bracket 94 contacts the gear head cover 48 and the lower end or tip of the auger contacts the ground, indicated at 84. Thereupon, further downward movement of the arms 22 will simply feed the auger vertically into the ground, while the bracket 80 becomes separated and swung downwardly from its point of contact with the adjacent arm 22, as shown in Figure 2. A reversal of the above operation takes place when the arms 22 are raised from the position shown in Figure 3 until the position shown in Figure 2 is reached, after which point the auger is not only lifted, but is swung rearwardly through the medium of the lever 74 and crank 78 when the bracket 80 again contacts the adjacent arm 22.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In combination with a tractor having a liftable and lowerable implement carrying arms, a hole digging attachment comprising a bracket pivotally attached to said arms, a gear head pivotally mounted in said bracket and swingable on a horizontal axis, an auger carried by said head and disposed vertically when in an operating position, and a tilting lever pivotally connected intermediate the ends thereof to said bracket at the point of connection of said head to the latter, one end of said lever being operatively connected to said head and the remaining end portion thereof being engageable with one of said arms upon lifting of said arms whereby said head may be automatically swung and said auger tilted to an inclined position when not in operation.

2. The device as defined in claim 1 together with a stop provided on said bracket, said stop being engageable by said gear head when said auger is in its vertical operating position, and resilient means for urging said gear head against said stop.

HENRY F. JACKSON.

REFERENCES CITED

The following references are of record in the file of this patent:

UNITED STATES PATENTS

| Number | Name | Date |
| --- | --- | --- |
| 1,622,704 | Coil | Mar. 29, 1927 |
| 2,217,300 | Templeton | Oct. 8, 1940 |
| 2,273,203 | Keene et al. | Feb. 17, 1942 |
| 2,320,775 | Garner | June 1, 1943 |
| 2,493,261 | Porter et al. | Jan. 3, 1950 |
| 2,509,410 | Applegate | May 30, 1950 |